United States Patent
Bae et al.

(10) Patent No.: US 8,572,583 B2
(45) Date of Patent: Oct. 29, 2013

(54) METHOD AND SYSTEM FOR TESTING SOFTWARE FOR INDUSTRIAL MACHINE

(75) Inventors: Hyunseop Bae, Seoul (KR); Kyung Hwa Choi, Seoul (KR); Seokjoo Choi, Seoul (KR); Seong Won Park, Anyang (KR); Seung Joon Lee, Anyang (KR)

(73) Assignees: Suresoft Technologies, Inc. (KR); LS Industrial Systems Co., Ltd. (KR)

( * ) Notice: Subject to any disclaimer, the term of this patent is extended or adjusted under 35 U.S.C. 154(b) by 1029 days.

(21) Appl. No.: 12/611,955

(22) Filed: Nov. 4, 2009

(65) Prior Publication Data

US 2011/0099540 A1    Apr. 28, 2011

(30) Foreign Application Priority Data

Oct. 28, 2009    (KR) ........................ 10-2009-0102585

(51) Int. Cl.
*G06F 9/44*    (2006.01)
*G06F 17/50*    (2006.01)

(52) U.S. Cl.
USPC ........... 717/135; 717/124; 717/127; 717/128; 717/131; 702/119; 702/120; 703/13; 703/22

(58) Field of Classification Search
None
See application file for complete search history.

(56) References Cited

U.S. PATENT DOCUMENTS

| | | | | |
|---|---|---|---|---|
| 5,058,052 A * | 10/1991 | Sexton et al. | ................. | 717/141 |
| 6,957,186 B1 * | 10/2005 | Guheen et al. | ................ | 705/323 |
| 6,959,431 B1 * | 10/2005 | Shiels et al. | .................. | 717/124 |
| 8,121,874 B1 * | 2/2012 | Guheen et al. | ............... | 705/7.11 |
| 2004/0128651 A1 * | 7/2004 | Lau | ................ | 717/124 |
| 2006/0184917 A1 * | 8/2006 | Troan et al. | ................... | 717/124 |
| 2008/0320071 A1 * | 12/2008 | Hoskins et al. | ............... | 709/202 |
| 2010/0107146 A1 * | 4/2010 | Wrighton et al. | ............. | 717/134 |
| 2011/0307860 A1 * | 12/2011 | Park et al. | ..................... | 717/107 |

* cited by examiner

*Primary Examiner* — Henry Tsai
*Assistant Examiner* — Michael Sun
(74) *Attorney, Agent, or Firm* — The Belles Group, P.C.

(57) ABSTRACT

There are provided a method and system for testing software for an industrial machine with continuous test values reflecting actual environmental factors, using a simulator before the software for the industrial machine is embedded into an actual industrial machine. A method for testing software for an industrial machine, the method comprising the steps of: coding a program for a diagram through which the industrial machine is driven; compiling the program into an instruction with which the industrial machine is driven; downloading the compiled program onto a simulator for implementing a programming interface provided by the industrial machine; executing the compiled program in the simulator: generating a first data for testing the compiled program: transmitting the first test data to the simulator having the downloaded program from a testing tool; and outputting a result data obtained after executing the program having the transmitted first test data and then transmitting the result data to the testing tool. Accordingly, it is possible to reduce a time taken for testing, to improve the accuracy and efficiency of the testing and to save cost required in the testing.

11 Claims, 3 Drawing Sheets

FIG.3

METHOD AND SYSTEM FOR TESTING SOFTWARE FOR INDUSTRIAL MACHINE

CROSS-REFERENCE TO RELATED APPLICATION

This application claims priority under 35 U.S.C. §119 to Korean Patent Application No. 10-2009-0102585, filed on Oct. 28, 2009, the entirety of which is hereby incorporated by reference.

BACKGROUND OF THE INVENTION

1. Field of the Invention

The present invention relates to a method and system for testing software for an industrial machine, and more particularly, to a method and system for testing software for an industrial machine with continuous test values reflecting actual environmental factors by using a simulator before the software for the industrial machine is embedded into an actual industrial machine.

2. Description of the Related Art

When coding software for an industrial machine, diagrams such as a programmable logic controller (PLC), a ladder diagram (LD), a function block diagram (FBD) and a sequential function chart (SFC) are used. Each of the diagrams is compiled into a code or instruction capable of driving the industrial machine by a compiler, based on requirements or standards accompanied by the diagrams. The compiled program is directly downloaded onto the industrial machine, and it is then tested whether or not the downloaded program is properly operated.

FIG. 1 is a flowchart illustrating a method for testing software for an industrial machine according to a related art.

Referring to FIG. 1, a program is first coded through a diagram such as LD, FBD or SPC (step 100). The coded program is then compiled by a compiler (step 110). The compiled program is directly embedded onto an industrial machine such as PLC (step 120). The industrial machine having the embedded program is tested for a predetermined time (step 130). If an error is found through the testing, the original code or program is modified by detecting the error (step 160). The steps of compiling, embedding and testing are repeated through the modified code or program. If no error is detected, the testing is finished (step 150).

As can be seen in the related art, after the program is verified with respect to its logic to some degree, it is immediately compiled and then embedded onto the industrial machine to be tested. Conventionally, industrial machines had a small scale and a low complexity of design. Hence, testing was sufficiently performed only by downloading a program to the industrial machine and making a trial operation of the industrial machine for some months. However, as industrial machines gradually become larger in size and more accurate, the complexity of logics for controlling the industrial machines is increased. Therefore, when using the related art method for testing software for industrial machines by actually downloading a compiled program to the industrial machines, it takes a long time for testing. In addition, since the testing is performed using actual industrial machines, it is almost impossible to test a program in consideration of various environmental factors as parameters.

When testing is performed using the related art method, data required in the testing are inputted one by one in a developing tool, and hence, it takes a long time for testing. Further, in a simulator provided from the developing tool, only logic verification for diagram engineering is possible, but system verification for diagram engineering is impossible.

SUMMARY OF THE INVENTION

The present invention provides a method and system for testing software for an industrial machine, which can reduce time for testing and improve accuracy.

The present invention also provides a method and system for testing software for an industrial machine, which can reflect actual environmental factors that may occur in industrial areas.

In one aspect, there is provided a method for testing software for an industrial machine, the method comprising the steps of coding a program for a diagram through which the industrial machine is driven; compiling the program into an instruction with which the industrial machine is driven; downloading the compiled program onto a simulator for implementing a programming interface provided by the industrial machine; executing the compiled program in the simulator; generating a first data for testing the compiled program; transmitting the first test data from a testing tool to the simulator having the downloaded program; and outputting a result data obtained after executing the program having the transmitted first test data and then transmitting the result data to the testing tool.

The method may further comprise the steps of generating a continuously changed second test data in the testing tool based on the result data transmitted from the simulator; and transmitting the second test data to the simulator.

In the method, the second test data may be determined based on environmental factors that are present in industrial areas.

In another aspect, there is provided a system for testing software for an industrial machine, the system comprising an engineering tool having an engineering module, a compiler and a downloader; a simulator for implementing a programming interface provided by the industrial machine; and a testing tool for transmitting a first test data to the simulator and receiving a test result of the simulator operated based on the first test data, wherein the compiler compiles a diagram for driving the industrial machine into a program, the downloader downloads the compiled program onto the simulator, and the testing tool generates the first test data based on the compiled program.

The testing tool may generate a continuously changed second test data based on the result data transmitted from the simulator and transmits the second test data to the simulator.

In the system, the second test data may be determined based on environmental factors that are present in industrial areas.

BRIEF DESCRIPTION OF THE DRAWINGS

The above and other aspects, features and advantages of the disclosed exemplary embodiments will be more apparent from the following detailed description taken in conjunction with the accompanying drawings in which.

DETAILED DESCRIPTION OF THE INVENTION

Figure 1:
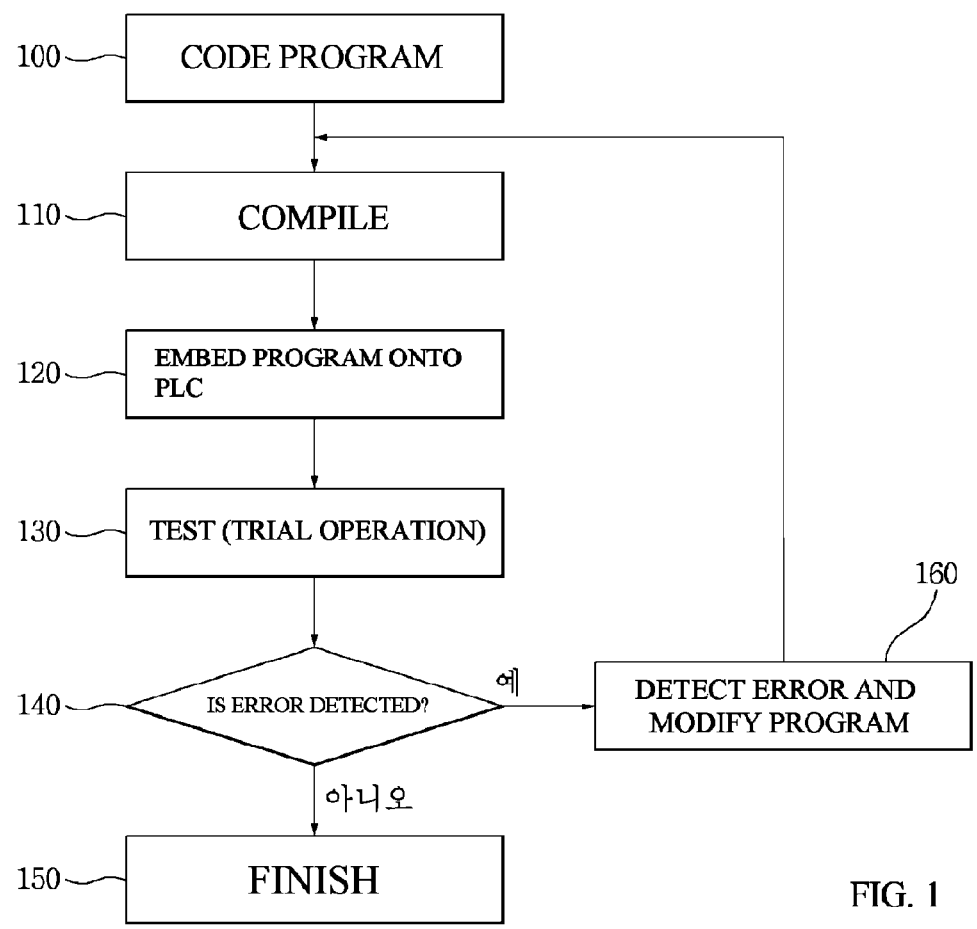
FIG. 1 is a flowchart illustrating a method for testing software for an industrial machine according to a related art.

Hereinafter, a method and system for testing software for an industrial machine according to an exemplary embodiment of the present invention will be described with reference to the accompanying drawings. Details of other embodiments are included in the detailed description and accompanying drawings.

The above and other aspects, features and advantages of the disclosed exemplary embodiments will be more apparent from the following detailed description taken in conjunction with the accompanying drawings. However, the present invention is not limited to the embodiments but may be implemented into different forms. These embodiments are provided only for illustrative purposes and for full understanding of the scope of the present invention by those skilled in the art. Throughout the specification, like reference numerals indicate like elements.

Figure 2:
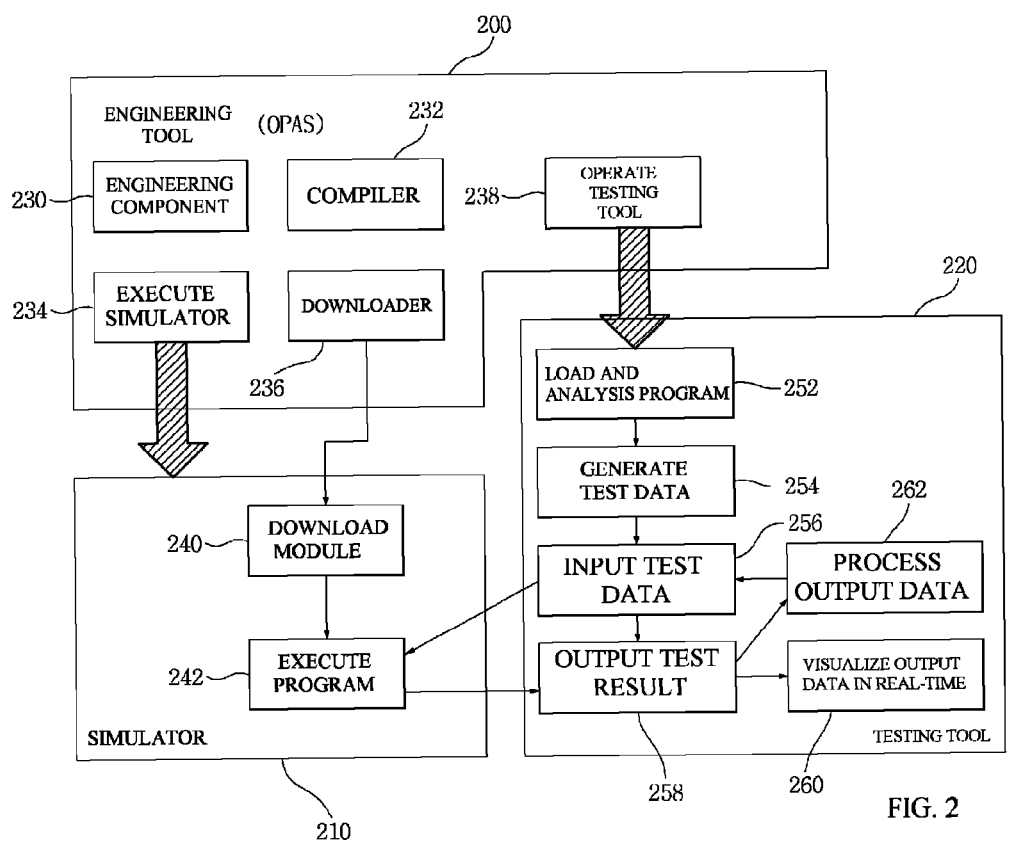
FIG. 2 illustrates a system for testing software for an industrial machine according to an embodiment of the present invention.

FIG. 2 illustrates a system for testing software for an industrial machine according to an embodiment of the present invention.

Referring to FIG. 2, the system comprises an engineering tool 200, a simulator 210 for an industrial machine, and a testing tool 220. The engineering tool 200, the simulator 210 for the industrial machine and the testing tool 220 may be configured as a separate software module or separate hardware.

In one embodiment, in an engineering component 230 of the engineering tool 200, a program to be driven in software for an industrial machine may be designed through a diagram such as a programmable logic controller (PLC), a ladder diagram (LD), a function block diagram (FBD) or a sequential function chart (SFC). That is, production processes to be sequentially performed may be designed through the diagram. A compiler 232 of the engineering tool 230 may compile the program coded through the engineering component 230 of the engineering tool 200 into an assembly code, a binary code, a byte code available for a virtual machine, and the like. In another embodiment, the engineering component 230 may process not only the program but also C, C++, JAVA and other scripting languages. The aforementioned languages to be processed by the compiler 232 are provided only for illustrative purposes, and the scope of this embodiment is not limited to the use of a specific language.

The compiled code is transmitted to a download module 240 of the simulator 210 through a downloader 236. If the engineering tool 200 transmits an instruction for simulator operation to the simulator 210 (234), the simulator 210 executes the compiled code.

In one embodiment, the simulator 210 may provide an application program interface (API) identical to that provided by the industrial machine and process program instructions inputted through the provided API in the same manner as the industrial machine. In another embodiment, the simulator 210 may provide a hardware interface layer (HIL) identical to that provided by the industrial machine and process program instructions inputted in an upper layer in the same manner as the industrial machine. In still another embodiment, the simulator 210 may generate an executive file linked to the compiled code through a library called by the compiled code downloaded from the engineering tool 200. That is, the simulator 210 may provide a software interface identical to that of an industrial machine used in an actual environment.

If the simulator 210 executes the program (242) and a testing tool is operated in the engineering tool 200 (238), the testing tool 220 performs the load and analysis of the compiled program (252). After the analysis is performed, a test data is generated (254), and the test data is transmitted to the simulator 210 (256). The simulator 210 provides the transmitted test data to the simulator 210 as a program (242), and the test result is again outputted to the testing tool 220 (258). The outputted test data is visualized in real time (260).

Here, the testing tool may generate a newly processed test data continuously changed based on the result data outputted from the simulator 210 (258) and then re-transmit the generated test data to the simulator 210. That is, after the outputted test result is processed in consideration of environmental factors that may occur in actual industrial areas, the processed test result is again inputted to the simulator 210, which may be referred to as a kind of feedback. When such a method is employed, testing for continuously changed values is possible. For example, if it is assumed that the test data inputted to the simulator 210 is a temperature, continuously changed values (e.g., 20, 21, 21.4 and the like) of the temperature can be tested rather than discontinuous values (e.g., 20, 30, 40 and the like) of the temperature. By using the system, the test can be performed only by setting a specific numerical value range without manually inputting continuously changed values one by one.

Figure 3:
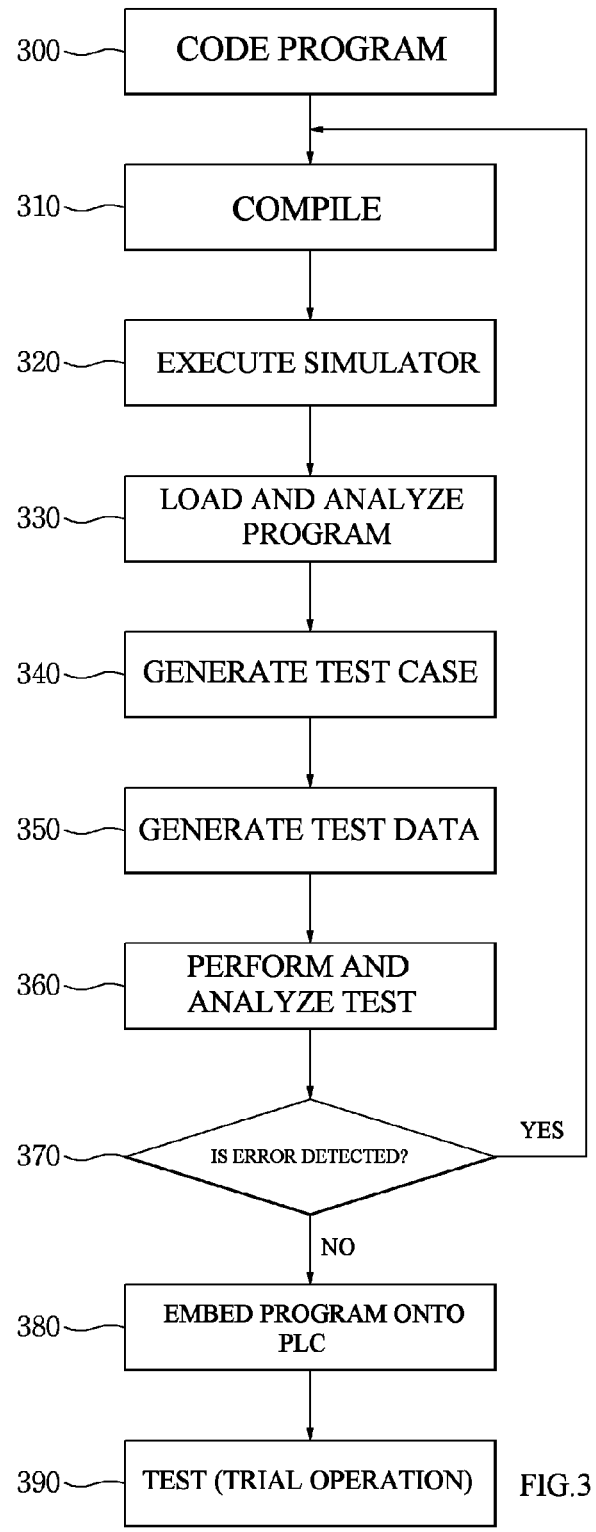
FIG. 3 illustrates a flowchart for performing a method for testing software for an industrial machine according to an embodiment of the present invention.

FIG. 3 illustrates a flowchart for performing a method for testing software for an industrial machine according to an embodiment of the present invention. The operation of the system will be described below.

Referring to FIG. 3, a program for PLC is coded through a diagram (step 300), and the coded program is compiled (step 310). The compiled program is downloaded to a simulator and then executed (step 320). A testing tool is operated in parallel or sequence with the simulator, and loads and analyzes the program (step 330). A test case is generated based on the analyzed result (step 340), and a test data is generated (step 350). The test case refers to a set of continuous data reflecting actual environmental factors. For example, a parameter such as temperature or pressure, which can be continuously changed in a specific range for a certain time interval, corresponds to the test case. The generated test data is downloaded onto the simulator, and the testing is performed and analyzed (step 360). If an error is detected in the test result, the program is modified and then performs the step 310. If no error is detected, the program is embedded into the PLC (step 380), and the testing is performed (step 390).

Before the program is embedded into the industrial machine (PLC), i.e., before the step 380, testing is sufficiently performed in consideration of actual environmental factors. Accordingly, it is easy to reduce a testing time, to process an exceptional condition, and the like. Further, it is possible to prevent an error that may occur at a very small probability in advance.

According to the present invention, testing is performed in consideration of actual environmental factors before a trial operation, so that it is possible to reduce a time taken for the testing, to improve the accuracy and efficiency of the testing and to save cost required in the testing.

While the exemplary embodiments have been shown and described, it will be understood by those skilled in the art that various changes in form and details may be made thereto without departing from the spirit and scope of this disclosure as defined by the appended claims. In addition, many modifications can be made to adapt a particular situation or material to the teachings of this disclosure without departing from the essential scope thereof. Therefore, it is intended that this disclosure not be limited to the particular exemplary embodiments disclosed as the best mode contemplated for carrying out this disclosure, but that this disclosure will include all embodiments falling within the scope of the appended claims.

What is claimed is:

1. A method for testing software for an industrial machine, the method comprising the steps of:
   creating a coded program comprising a diagram through which the industrial machine having a programmable logic controller is driven, wherein the diagram includes production processes to be sequentially performed by the industrial machine:
   compiling the coded program using a compiler into a compiled program comprising an instruction with which the industrial machine is driven;
   downloading the compiled program onto a simulator for implementing a programming interface provided by the industrial machine;
   executing the compiled program in the simulator;
   loading the compiled program into a testing tool;
   analyzing the compiled program using the testing tool before the compiled program is embedded in the programmable logic controller of the industrial machine;
   generating a first data by the testing tool for testing the compiled program;
   transmitting the first test data from the testing tool to the simulator having the downloaded compiled program; and
   analyzing the first test data using the simulator for errors;
   wherein if an error is not detected in the first test data using the simulator, the compiled program is embedded into a programmable logic controller associated with the industrial machine.

2. The method according to claim 1, further comprising the steps of
   generating a continuously changed second test data in the testing, tool based on the result data transmitted from the simulator; and
   transmitting the second test data to the simulator.

3. The method according to claim 2, wherein the second test data is determined based on environmental factors present in industrial areas.

4. A non-transitory computer readable medium containing an instruction for performing the method according to claim 1.

5. A non-transitory computer readable medium containing an instruction for performing the method according to claim 2.

6. A non-transitory computer readable medium containing an instruction for performing the method according to claim 3.

7. The method according to claim 1, wherein if an error is detected in the first test data using the simulator, the compiled program is modified.

8. A system for testing software for an industrial machine, the system comprising:
   an engineering tool having an engineering module, a compiler and a downloader;
   a simulator for implementing a programming interface provided by the industrial machine having a programmable logic controller; and
   a testing tool for transmitting a first test data to the simulator and receiving a test result of the simulator operated based on the first test data,
   wherein the compiler compiles a diagram for driving the industrial machine into a compiled program, the downloader downloads the compiled program onto the simulator, the testing tool generates the first test data based on the compiled program, and the simulator analyzes the first test data for errors;
   wherein if an error is not detected in the first test data using the simulator, the compiled program is embedded into a programmable logic controller associated with the industrial machine.

9. The system according to claim 8, wherein the testing tool generates a continuously changed second test data based on the result data transmitted from the simulator and transmits the second test data to the simulator.

10. The system according to claim 9, wherein the second test data is determined based on environmental factors present in industrial areas.

11. The system according to claim 8, wherein if an error is detected in the first test data using the simulator, the compiled program is modified.

* * * * *